(12) United States Patent
Savangikar et al.

(10) Patent No.: US 9,993,018 B2
(45) Date of Patent: Jun. 12, 2018

(54) NUTRITIONAL SUPPLEMENTS FROM GREEN LEAFY VEGETABLES

(76) Inventors: Chitra Vasant Savangikar, Nashik (IN); Vasant Anantrao Savangikar, Nashik (IN)

( * ) Notice: Subject to any disclaimer, the term of this patent is extended or adjusted under 35 U.S.C. 154(b) by 104 days.

(21) Appl. No.: 13/819,903

(22) PCT Filed: Aug. 30, 2011

(86) PCT No.: PCT/IN2011/000591
§ 371 (c)(1),
(2), (4) Date: Feb. 28, 2013

(87) PCT Pub. No.: WO2012/029075
PCT Pub. Date: Mar. 8, 2012

(65) Prior Publication Data
US 2013/0156894 A1   Jun. 20, 2013

(30) Foreign Application Priority Data

Aug. 30, 2010   (IN) .......................... 2411/MUM/2010

(51) Int. Cl.
| | | |
|---|---|---|
| *A61K 36/00* | (2006.01) | |
| *A23L 1/30* | (2006.01) | |
| *A23L 2/385* | (2006.01) | |
| *A23L 2/39* | (2006.01) | |
| *A23L 2/52* | (2006.01) | |
| *A23C 9/133* | (2006.01) | |
| *A23C 19/05* | (2006.01) | |
| *A23P 10/40* | (2016.01) | |
| *A23L 7/10* | (2016.01) | |
| *A23L 7/161* | (2016.01) | |
| *A23L 19/00* | (2016.01) | |
| *A23L 27/14* | (2016.01) | |
| *A23L 33/105* | (2016.01) | |
| *A23L 33/16* | (2016.01) | |
| *A23L 33/175* | (2016.01) | |
| *A23L 33/21* | (2016.01) | |
| *A23L 23/00* | (2016.01) | |

(52) U.S. Cl.
CPC ............ *A23L 1/3002* (2013.01); *A23C 9/133* (2013.01); *A23C 19/054* (2013.01); *A23L 2/385* (2013.01); *A23L 2/39* (2013.01); *A23L 2/52* (2013.01); *A23L 7/101* (2016.08); *A23L 7/161* (2016.08); *A23L 7/198* (2016.08); *A23L 19/09* (2016.08); *A23L 23/00* (2016.08); *A23L 27/14* (2016.08); *A23L 33/105* (2016.08); *A23L 33/16* (2016.08); *A23L 33/175* (2016.08); *A23L 33/21* (2016.08); *A23P 10/40* (2016.08); *A23C 2240/15* (2013.01); *A23V 2002/00* (2013.01)

(58) Field of Classification Search
CPC ..................................................... A61K 36/00
See application file for complete search history.

(56) References Cited

FOREIGN PATENT DOCUMENTS

RU         2192139 C2 * 11/2002
WO    WO 2008081472 A1 *  7/2008

* cited by examiner

*Primary Examiner* — Qiuwen Mi
(74) *Attorney, Agent, or Firm* — Intellectual Property Law Group LLP

(57) ABSTRACT

This invention discloses packaged nutritional supplements that have nutritional ingredients derived from green leafy vegetation that shall collectively or singly be useful to fulfill the daily need of supplementation from one or more of a nutrient from green leafy vegetation. One embodiment of this invention discloses a novel packaged composition that comprises at least one fraction of a green leafy vegetation and at least one more ingredient to improve its usability and is source of at least one nutritional ingredient selected from the group dietary fiber, beta carotene, iron, calcium, xanthophylls, folic acid and lysine plus methionine and cystine; wherein the fraction comprises a fibrous fraction, a water soluble deproteinized juice fraction and a water insoluble high protein low fiber fraction as fourth primary fraction. In one embodiment of invention, the contribution of at least one nutrient to the nutrient content of the composition from green leafy vegetation or its fraction is a least 15% of at least content of one nutrient of the composition. Also disclosed is a novel packaged composition comprising pulp of whole edible green leafy vegetation and at least one component of flax-seed in the form of a soup or a food bar. The component of flax seed may be one or more selected from the group of whole flax seed, flax seed cake or flax oil.

4 Claims, No Drawings

NUTRITIONAL SUPPLEMENTS FROM GREEN LEAFY VEGETABLES

CROSS-REFERENCE TO RELATED APPLICATIONS

This application is a National Stage application of International Application No. PCT/IN2011/000591, filed on Aug. 30, 2011, which claims priority of Indian application Serial Number 2411/MUM/2010, filed on Aug. 30, 2010, both of which are incorporated herein by reference in their entireties.

BACKGROUND OF THE INVENTION

Field of the Invention

Invention pertains to preparing nutritional supplements from green leafy vegetation. More particularly it pertains to preparing easily consumable or palatable synergistic compositions of a nutritional supplements from green leafy vegetables.

Description of the Prior Art

A person shall remain in a healthy state if he consumes all the essential nutrients every day through food. The nutrients considered as "Essential" are those that are not synthesized in human body and must be consumed through food. They, however, come from diverse food sources, are most of the times associated with other desired or undesired constituents such as water and most of such sources are perishable too. Availability of such food sources may also fluctuate with seasons, market conditions and location. Under practical circumstances, it is often difficult to manage food sources that fulfill that person's ideal daily nutritional needs.

Due to urbanization, the food consumption pattern itself has undergone a material change generating nutritional imbalances. In recent understanding of genesis of diseases, the nutritional imbalances themselves have been perceived to trigger inflammatory responses from the body or oxidative damages which in turn result into several lifestyle related diseases, such as cardiovascular diseases, hypercholesterolemia, hyperlipidemia, diabetes, hypertension, acidity etc. In addition to life threatening diseases, life quality threatening diseases/disorders are on a rise which include gastrointestinal disorders/diseases arising from low fiber diets such as constipation, colon cancer, etc. Further, deficiency related disorders such as anemia, vitamin D deficiency, calcium loss and bone mass loss, age related macular degeneration are also on rise. Disorders like anxiety, depression, Alzheimer's syndrome, Parkinson's disease etc and other related psychotropic diseases, are also increasingly been perceived to be amenable to modulation to varying extent by nutritional intervention.

Even infectious diseases that are prima facie ascribed to infections from pathogens may in many cases be traceable to increased susceptibility of the victim to that infection on account of lowering of immunity or resistance which may be due to debility arising from deficiency of one or more essential nutrients or inflammation.

Nutritional supplements have emerged as a means to bridge up the gap between nutrients consumed through the every day intake of staple food eaten conventionally throughout the day and their recommended intake per day.

Most of the nutritional supplements are predominantly based on fortified cereals, milk protein, soya protein concentrate, with or without further supplementation by inorganic minerals and synthetic vitamins. It is now realized that many sources of synthetic vitamins are not used by the body with same efficiency as natural sources of the same; viz. Natural Beta-carotene and alpha-tocopherol as compared to their synthetic or isolated counterparts. Realization is also growing that minerals associated with natural products are more efficiently absorbed and more efficiently utilized than the same minerals administered as inorganic salt supplements.

Further, in addition to what is supplied by above nutritional supplements, a major lacuna still exists in the context of the nutrients supplied by green leafy vegetables/vegetation. Most of the nutrients contained in the green leaves provided by one 100 gram serving have to come through green leafy vegetation only, the group of nutrients available in green leafy vegetation is simply not available in any single alternative conventional food source; several other natural sources will have to be eaten collectively and simultaneously to get the same group of nutrients at the same time every day, which is practically difficult to achieve on a regular basis and they will have to be consumed in a quantity that can not be practically consumed. An illustrative list of such nutrients available through green leaves includes: chlorophylls, carotenes, xanthophylls, alpha tocopherols, phytosterols, highly bio-available calcium and iron, vitamin K, folic acid, poly unsaturated fatty acids containing the omega-3-alpha linolenic acid and importantly, also, high biological value dietary protein and dietary fiber. All these nutritional ingredients are individually very important part of nutritional requirements and some of them are likely to establish themselves as therapeutically effective to prevent or treat various diseases or disorders. It is for this very reason that despite consumption of dietary nutritional supplements made from Soya proteins, whey proteins, milk proteins etc., nutritionists recommend consumption of green leafy vegetables of about 150 gm with lunch and dinner to ensure that the nutrients consumed through food and other supplements be made more effective.

It is a matter of fact that the recommended consumption of green leafy vegetables is possible with a regularity to a very few people.

It becomes clear that to achieve a completeness in supplementation of the daily diet with nutritional supplements, a viable alternative nutritional supplement to fulfill the vital nutrients provided by a portion of 100 to 150 gram of green leafy vegetables in every meal is an important necessity.

SUMMARY OF THE PRESENT INVENTION

This invention has disclosed packaged nutritional supplements that have nutritional ingredients derived from green leafy vegetation that shall collectively or singly be useful to fulfill the daily need of supplementation from one or more of a nutrient from green leafy vegetation.

One embodiment of this invention discloses a novel packaged composition that comprises at least one fraction of a green leafy vegetation and at least one more ingredient to improve its usability, 100 gram of the composition on dry weight basis comprising at least one nutritional ingredient being selected from the group (a) dietary fiber at least 3 gram, (c) beta carotene at least 500 microgram, (d) iron at least 3 mg, (e) calcium at least 150 mg, (g) xanthophylls at least 4 mg, (h) folic acid at least 35 microgram, and (i) lysine at least 900 mg of and Methionine plus cystine at least about 550 mg; wherein the fraction comprises first three primary fractions as well as sub-fraction or a modified fraction of the three primary fraction of the green leafy vegetation; the primary fraction being obtained in a process of green crop fractionation, wherein the fractionation process comprises the steps of: (i) comminuting fresh green crop material, (ii) separating a moist fibrous fraction as first primary fraction from the juice as second primary fraction, and treating the juice fraction to separate a water soluble deproteinized juice that is high in water content as third primary fraction from a water insoluble high protein low fiber fraction as fourth primary fraction, which is also variously known as leaf protein concentrate (LPC) or simply as leaf protein (LP).

Usability comprises property which facilitates use of the ingredient of the green leafy vegetation. This, is an edible composition, the use may be facilitated by modifying unfavorable taste, or unfavorable color, or unfavorable flavor or unfavorable solubility in water, or unfavorable dispersibility in water. In case of a topical composition, a carrier may be needed such as a petroleum jelly.

In one embodiment of invention, the contribution of at least one nutrient to the nutrient content of the composition from green leafy vegetation or its fraction is a least 15% of at least content of one nutrient of the composition.

The primary fractions mentioned above are either microbiologically stabilized before use as an ingredient in a dry mix or they are wet processed to make high moisture compositions, packaged and the packages are microbiologically stabilized either by sterilizing at 120° C. under a pressure of 15 pounds per square inch for at least 20 minutes, or by adding permitted preservatives or deep freezing below 0° C. to up to −40° C. or by expelling moisture until moisture content of the composition is below 10% up to 5%.

The compositions of this invention comprising the fibrous fraction as at least one ingredient are illustrated by non-limiting examples of the following compositions: (a) composition A comprising: (i) fibrous fraction dry powder, (ii) one or more thickeners enough to improve stability of suspension when diluted and brought to boil in a defined quantity of water under conditions of use as a soup, (iii) spices and condiments, (b) composition B comprising curd, made by adding fibrous fraction dry powder to milk, heating to boiling and cooling to room temperature, adding starter culture of curd, mixing once when curd is in initial stage of thickening and allowing the curd to form, (c) composition C comprising a cheese or paneer obtained by adding fibrous fraction dry powder to milk, heating to boiling and cooling the same to room temperature, curdling the milk, allowing excess water to drain off, pressing the curdled curd to remove excess fluid, (d) composition D of a "Ready To Eat" recipe comprising a mix of a cooked snack recipe and fibrous fraction dry powder.

The compositions of this invention comprising deproteinized juice as at least one ingredient are illustrated by non-limiting examples of the following compositions: (a) composition E of bottled soft drink comprising carbonated or non-carbonated deproteinized juice, and one or more of additional ingredients for improved flavor, taste and a preservative, (b) composition F of a syrup comprising the deproteinized juice and one or more of additional ingredients for improved flavor, taste and a preservative, (c) composition G of a soft drink dry concentrate intended to be diluted before consumption comprising dry powder of the deproteinized juice and one or more of additional ingredients for improved flavor and taste, (d) composition H of a capsule or a tablet comprising dry powder of the deproteinized juice, excipients and fillers.

A composition of this invention comprising at least high protein low fiber fraction (LPC) or its sub-fraction, wherein the high protein low fiber fraction is a fourth fraction obtained in the a process of green crop fractionation described above comprised (a) LPC about 1 part of the composition, (b) a flour of parched wheat grains; and is added about 2 to 6 parts of the LPC, (c) flour of parched Grain Amaranth or a flour of puffed Grain Amaranth seeds; and is added about 2-8 parts of the LPC, (d) optionally garnishing of dry fruits, and (e) optionally containing one or more flavorings selected from the group comprising nutmeg, strawberry, cardamom, Vanilla, chocolate and Cacao.

The composition of this invention for topical use for application to skin or hair for nourishment wherein the sub-fraction of the high protein low fiber fraction comprises an edible oil extract of LPC, to which is added a carrier for topical application and optionally fragrances.

The composition of this invention wherein the carrier is a hair oil further comprises petroleum jelly or another cream base or another hair oil base.

A Soft gelatin capsule containing an edible oil extract of LPC is yet another composition of this invention.

The composition of this invention comprising high protein low fiber fraction (LPC) as at least one ingredient comprises following embodiments: (a) composition I comprising: (i) high protein low fiber fraction (LPC), (iii) buttermilk, (iv) optionally one or more thickeners to improve stability of suspension to be used as a soup, (iv) spices and condiments, (b) composition J comprising curd made by adding high protein low fiber fraction (LPC) to milk, heating to boiling and cooling to room temperature, adding starter culture of curd, mixing once when curd is in initial stage of thickening and allowing the curd to form, (c) composition K comprising a cheese or paneer obtained by adding high protein low fiber fraction (LPC) to milk, heating to boiling and cooling the same to room temperature, curdling the milk, allowing excess water to drain off, pressing the curdled curd, (d) Composition L of a Ready to eat recipe comprising a cooked snack recipe and high protein low fiber fraction (LPC) added to the same.

A novel packaged composition of this invention comprises pulp of whole edible green leafy vegetation and at least one component of flax-seed in the form of a soup or a food bar. The component of flax seed may be one or more selected from the group of whole flax seed, flax seed cake or flax oil.

The green leafy vegetation used in this invention comprises a conventional green leafy vegetable or a forage crop or a by-product leaves of cole crops or leaves of legume crops or other non-toxic vegetation.

DETAILED DESCRIPTION OF THE PRESENT INVENTION

In one embodiment, the ingredients of the nutritional supplement compositions of this invention are manufactured by a process of green crop fractionation. Green crop is processed to ensure that nutrients in the cells are released, isolated, packed and properly preserved to make them available for year round daily supply. Year-round availability of nutrients from green leafy vegetation/vegetables shall help to fulfill the daily need of vital supplementation of nutrients that are available from a portion of green vegetables in each meal. That may be useful to maintain health, control ageing, keeping vitality and reducing susceptibility to various diseases and disorders. For patients under treatment, an appropriate application of these supplements may contribute to stimulate better response to the treatment and speedy recovery to normalcy.

In a simplest conceivable method of supplementation from green leafy vegetables, the same may be dried, powdered and used as an ingredient in the supplements. Of all the methods invented here, this, however, is an inefficient method of green vegetables based supplements for two reasons. Firstly, drying of a green leafy vegetable leads to destruction of large proportion of highly oxidizable active principles in the leaves, reducing the effective value of the supplement. Secondly, destruction of cells is only partial, human intestine is not capable to attack the hard lignocellulosic walls of plant cells to release the nutrients for absorption in human intestine. A major portion of nutrients is likely to remain locked in the cells and pass out undigested.

In further embodiment of this invention, the supplementation from green leafy vegetables may be achieved when they are pulped while fresh to give a pulp or a homogenate so that majority of cells are broken open to release nutrients in the pulp and the wet pulp is used as an ingredient for making a nutritional supplement composition or a supplemented food preparation. This method is limited to use of green leafy vegetables which do not have adverse tasting contents that get released after pulping in a predominant proportion. Spinach, lettuce are the examples wherein pulping of the green leafy vegetable does not release adverse tasting factor; whereas, Fenugreek is an example where its bitterness is not so repulsive when eaten as a vegetable done in a traditional way wherein disintegration of cells is very much limited; however, in the step of pulping as described above in this invention, pulping leads to release of substantially more quantity of bitterness so as to make the pulp extremely bitter.

Normally, green leafy plant species with toxic or undesirable ingredients in the vegetation can not certainly be not used for consumption as pulp. They are also not normally preferred for use through fractionation too. However, if there is a need to utilize any such green leafy plant species, method of green crop fractionation illustrated by Pirie (1970) (Pirie N. W. Ed. "Leaf Protein: its agronomy, preparation, quality and use", IBP Handbook no. 20, published for the International Biological Program by Blackwell Scientific Publication, Oxford and Edinburgh, 1970) and Pirie (1978) (N. W. Pirie. "Leaf protein and other aspects of fodder fractionation", Cambridge University Press) for a very large number of edible as well as non-edible or toxic components and by Savangikar and Joshi (1978) (Savangikar V. A. and Joshi, R. N., "Edible protein from *Parthenium hysterophorus* L." *Experimental Agriculture*, 1978, vol 14, issue 1, pages 93-84) for toxic plant *Parthenium hysterophorus* L. has shown that when green crop is pulped, juice is removed, juice is coagulated to de-proteinize, the toxic elements go in deproteinized juice and protein rich coagulum can be washed free of the toxic component either by hot water wash or by acid water wash. Work of Pirie and several workers in green crop fractionation which spanned from about 1940 to 1980 and of other contemporary workers overlapping this period and up to the end of 2006 concentrated only on the high protein low fiber fraction called as Leaf Protein Concentrate (LPC) as a protein-xanthophyll concentrate for supplementation of dietary proteins and carotenes and xanthophylls and to some extent considered useful for calcium and iron supplementation; fibrous fraction was seen as a cattle feed by-product and deproteinized juice (DPJ) was seen as another by-product mainly as a liability for disposal on account of its biological oxygen load. Use for DPJ was suggested variously as a fertilizer to be flown into a field, or as a medium for microbial growth.

Thus, the process of fractionation as described by Pirie (1970), comprising pulping the green leafy vegetation, pressing the juice out, coagulating the juice by various treatments, preferably by heat treatment, separating deproteinized juice from high-protein low fiber coagulum [variously called as Leaf Protein Concentrate (LPC), or Leaf Protein (LP)] is useful in preparing high protein fraction of green leafy vegetation that is primarily useful if the plant species is not toxic, or for preparing at least all fractions other than deproteinized juice if the plant species is toxic. Pirie (1970, page 4) has pointed out that if proper husbandry is provided to green leafy plant species, all of them could be used for green crop fractionation; including wild plants; toxicity was stated to be probably not an obstacle to their use because nearly all known toxic components of leaves would be extracted from the protein during the process of purification. As pointed out above, Savangikar and Joshi (1978) verified this in case of *Parthenium hysterophorus* L which causes contact dermatitis. Thus, scope for utilization of fractions obtained from green leafy vegetation extends to practically all green leafy plant species in general, which is confirmed at several places in the above cited book of Pirie (1970) with respect to work done on 21 plant species described on pages 21 to 22, several unconventional species examined by Lexander et al (1970) (Lexander K., Carlsson R., Schalein V., Simmonson A, & Lundborg T. 1970, "Quantities and qualities of leaf protein concentrates from wild species and crop species grown under controlled conditions" *Ann. appl. Biol,* 66, 193; as quoted in Pirie 1970, page 33). However, for a very long period since work started on green crop fractionation, the focus was only on the LPC for possible utilization of nutrients for human consumption.

It was for the first time that Savangikar and Savangikar in WO/2008/081472 (having a priority of 26 Dec. 2006) disclosed that fibrous fraction, de-proteinized juice and edible oil extracts of LPC and fibrous fraction could be used as valuable nutritional sources. However, LPC, despite its high nutritive value and work over about 40 countries, for more than 70 years could not get incorporated into viable nutritional supplement products on account of its unfavorable organoleptic properties such as dark green color, grassy flavor and no solubility in water and no dispersibility in water. During all these years, LPC has been incorporated by researchers in several conventional recipes, human feeding trials of these recipes did show nutritional benefits, however, this trend could not stabilize as a widely accepted practice. In fact, the green leafy vegetables themselves have continued to be least favored items in daily food consumption since many do not like their flavor and organoleptic taste and feel; and unfavorable organoleptic properties get further intensified to unfavorable side in their fractions. The LPC had dark green color, becomes black and gritty when dried, when powdered it regains dark green color which is better than black color and texture is smoother than the dry grits; however, it has strong grassy flavor that is repulsive even for habitual vegetarians. With these problems with LPC despite concerted efforts for over 70 years on more than 40 countries by several researchers to introduce LPC into regular consumption, the hurdle to overcome for fibrous fraction and deproteinized juice is further difficult to overcome since fibrous fraction is coarse in texture, the de-proteinized juice has stronger unfavorable flavors that are not felt when whole green leafy vegetable is eaten and both fractions were never contemplated even by LPC workers for their health benefits for human consumption or introduction into recipes.

We analyzed the issues and realized that the unfavorable properties of LPC, its sub-fractions such as enriched edible oil that contain oil soluble pigments, anti-oxidants and pro-vitamin A, fibrous fraction and de-proteinized juice when used as an ingredient in conventional recipe modify the conventional taste and flavor of the conventional recipes so much that it does not appeal to and does not match to the organoleptic image of the conventional recipe leading to rejection of the modified conventional recipe with the fraction incorporated in it. Thus, it was necessary to find out ways to overcome the unfavorable organoleptic properties of these fractions and device new recipes that would take best benefit of the modified organoleptic properties, would be acceptably tasty and preferably have nutritive compositions that would synergistically or additively improve nutritive value and serve as sources of health improving nutrients in a reasonable quantity that can be consumed as supplement on per day basis as packaged compositions. New recipes having agreeable organoleptic properties would have better prospects to get rooted in regular consumption since their taste and properties do not conflict with any set of pre-conceived set of organoleptic properties.

In this invention, the scope of plant species that can be used comprises all green leafy vegetable plant species when whole pulp of the green leafy plant is envisaged to be used since people are already accustomed to eating them through thousands of years. However, where fractions of green leafy vegetation are desired to be used, the scope of useable plant species extends to all non-toxic green leafy vegetation plant species. This includes most of the legume crops in tender stage of growth.

An embodiment of this invention comprises compositions derived from utilizing fractions of green leafy vegetation obtained by one or more of a following steps or a combination or a variation of them: (a) the green leafy vegetation is disintegrated, (b) its nutrients released from the cells, preferably in presence of at least one antioxidant in a quantity enough to prevent oxidative destruction of oxidizable active ingredients, and (c) the said nutrient is used as an ingredient of nutritional/food products or supplements or fractionated in several fractions and individual fraction, with or without further treatment, used as an ingredient of nutritional product/nutritional supplement/food product/food supplement in conjunction with one or more of ingredients that would overcome its organoleptic or other property that is unfavorable for its consumption; wherein the said nutritional product/nutritional supplement/food product/food supplement has a shelf life longer than at least one day at a normal room temperature above 10° C. and the same is not a traditional or conventional recipe. All throughout this specification, "conventional recipe" does not refer to a kind of recipe but means a composition of ingredients that is traditionally eaten since a long time and has developed a well defined organoleptic perception in the population. A "conventional recipe" does not include a recipe wherein the kind is conventional but has an ingredient that is different to mask the unfavorable organoleptic property of green leafy vegetation. The said nutritional product/nutritional supplement/food product/food supplement may conveniently be a packaged product and be shelf stable. The said nutritional product/nutritional supplement/food product/food supplement may also be a nutritionally labeled product. It is preferred that the nutritional composition of this invention comply as a source of at least one nutrient in a quantity that would be consumed per day. A composition would be considered as "a source of" a nutrient provided it supplied at least 15% of daily recommended intake/allowances (DRI/DRA) of the nutrient or conforms to well recognized threshold of minimum content in the composition. For the purpose of this invention, "Regulation (EC) No. 1924/2006 of the European Parliament and of the Council of 20 Dec. 2006" and Daily Recommended Allowances mentioned in Annex of "Council Directive of 24 Sep. 1990 on nutrition labeling for foodstuffs (90/496/EEC) (OJ L 276, Jun. 10, 1990, page 40)", have been taken as a guide to define minimum nutritional standard of the composition of this invention.

The "green leafy vegetation" for the purpose of this specification may comprise green leaves or entire shoot with leaves or only green tender shoots or entire herbaceous plant without roots.

In a further embodiment of this invention, a conventional recipe may be itself so strongly flavored or has dominant organoleptic properties that incorporation of the fraction of green leafy vegetation masks the unfavorable flavor. Mixtures of spices and condiments, known as Masla mixes are one non-limiting example of this embodiment. In this embodiment, wherein the Masla mix shall very easily act as a carrier of fibrous fraction dry powder for adding to cooking of main dishes of vegetarian and non-vegetarian origin. Thus, such a recipe shall be carrier of the desired fraction of a fraction of green leafy vegetation for integrating into the food consumption. Incorporation of powder of fibrous fraction or LPC in a process of making a curd or cheese or paneer are examples of conventional recipe being a major carrier of the desired fraction overcoming its unfavorable organoleptic properties.

Thus, in another embodiment, this invention comprises a process further comprising steps of: (I) green leafy vegetation is disintegrated to get a pulp and either used as such as an ingredient of a nutritional/food supplement/product, or (II) the pulp is processed further to separate juice from the fibrous fraction, (i) the fibrous fraction is preserved wet or dried and eventually used as an ingredient of nutritional/food supplement/product, with or without further processing, (ii) the juice is heat-treated and used without further fractionation or is treated to separate (a) a nutrient concentrate comprising proteins, fats and other water insoluble ingredients associated with them from (b) a deproteinized brown juice containing water soluble ingredients of the juice; and each of these fractions is used with or without further processing as an ingredient of a composition of a nutritional/food supplement; wherein the said nutritional/food products/supplements have a shelf life longer than at least one day at a normal room temperature above 10° C., and the same is not a conventional recipe. In one embodiment of above invention, the said green leafy vegetable is heated prior to subjecting it to step of disintegration. The pretreatment may comprise a treatment that softens the tissue. The pretreatment may be a heat treatment. The heat treatment may be given by immersion of the green leafy vegetable in boiling water for a period of time. The pretreatment may also be by an autoclaving treatment i.e. by subjecting the green leafy vegetable to a steam pressure of about 15 psi (pounds per square inch) at 121° celcius.

The disintegration may be made using commonly available mechanical blenders, pulverizers or by making special purpose machines that apply shearing force to the vegetation so that it leads to mechanical maceration of the tissue of the vegetation resulting in a pulp.

The process of making fractions described above, Green Crop Fractionation, for getting the basic fractions of pulp, juice, the said nutrients concentrate of juice ingredients that are insoluble in water, deproteinized brown juice containing water soluble ingredients of the juice and fibrous fraction has been a subject of research in several countries for more than about 70 years as cited in Pirie (1970) and Pirie (1978) above, however, practical utilization of these fractions for human consumption has yet remained to be satisfactorily achieved. This work done so far has established the nutrient concentrate as a valuable dietary supplement as a source of high Biological Value (BV) dietary protein that is high in lysine, beta carotene, xanthophylls, poly unsaturated fatty acids including alpha linolenic acid, calcium and iron. The emphasis had always been on investigating and establishing nutritional value of the nutrients concentrate as a supplement. All along the history of prior work on green vegetation, the nutrient concentrate had been incorporated into conventional recipes for conducting several nutritional intervention trials involving school going children, expectant mothers, anemic young girls and patients with diseases in need of nutritional supplements. All these trials proved efficacy of these nutritional supplements with respect to delivery of nutrients contained by them as well as safety of the nutrient concentrate. However, despite excellent results, the nutrient concentrate never came up as a practical nutritional/food supplement mainly because it is a water insoluble dark green product having a grassy flavor which are considered basically as unappealing organoleptic properties by themselves, and further, they are transferred and expressed in the conventional recipes in which they are incorporated. Unfavorable organoleptic properties has remained a major obstacle in practical widespread use of the nutrient concentrate derived from green leafy vegetation. The other two fractions i.e. fibrous fraction and de-proteinized fluid were never perceived to any practical application for human consumption and have been perceived as bye-products that need to be disposed off Savangikar & Savangikar (WO/2008/081472) for the first time in 2006 envisaged processing the fibrous fraction as well as deproteinized juice to stabilize them as fractions useable for human consumption further and proposed them as useful for the first time for human consumption. However, making shelf stable palatable supplements from them was still a task that was left to be achieved for the future.

The present invention comprises a nutritional/food supplement that comprises at least one nutritionally active component liberated from macerated and disintegrated tissue of a green leafy vegetation and at least one more additional ingredient that makes the composition organoleptically palatable and novel products.

In one embodiment of the invention, nutritionally active component liberated from macerated and disintegrated tissue of a green leafy vegetation is nutrient concentrate. In one illustrative composition of this embodiment, the said additional ingredient comprises mixture of parched wheat flour and puffed grain amaranth. Parching of wheat and puffing of grain amaranth improves their digestibility on one hand and imparts an attractive taste and flavor. It was seen that dispersibility of LPC in the compositions intended to be diluted with water under conditions of use was improved by using these flavor enhancing ingredients which also gave appropriate thickness to the composition. Flavor giving ingredients such as puffed Amaranth seeds had lesser ability to give thickness and puffed rice had practically no ability to give thickness, however, appropriate combinations could be worked out that gave flavor of all of them and also thickness required to keep the LPC particles afloat under conditions of use. Many other equivalent combinations and ingredients may be used to achieve same effect. They are mixed in such a proportion with respect to nutrient concentrate that there is mutual supplementation with respect to essential amino acids to make it as close as possible to the Essential Amino Acid composition of F.A.O./W.H.O. Reference Protein (1965) [Protein Requirements. *F.A.O. Nutr. Mtg. Rep. Ser. No.* 37 (Food and Agricultural Organization, Rome)]. This mixture could be consumed as such, or with a sweetener as a solid powder. This mixture could also be consumed by turning it to a paste or a thick fluid beverage by diluting with water or milk and adding a sweetener to give a very agreeable mouth-feel, flavor and taste. This could also be consumed as salty or/and hot recipe with buttermilk. The unfavorable impact of dark green color of the particles of the nutrient concentrate (LPC) gets substantially reduced and in fact becomes appealing as a green supplement on the white to cream colored back ground of particles of wheat flour and puffed green amaranth. When about 10 gram of this composition is added to water or milk, boiled and cooled to a temperature that can be consumed, the suspension remained stable without visible settling of the insoluble LPC particles. In this embodiment, wheat flour may be partly or fully be replaced by flour of other cereals, puffed or otherwise. Other ingredients having moderately good lysine or/and good to rich sulfur amino acids (Methionine and cystine) and contributing to a favorable taste and flavor, including but not limited to Sesame may also be added to varying extents. Permitted colors, permitted flavors including Coco, Chocolate and Cardamom, and taste and flavor improving adjuvants including pieces of various dry-fruits may also be added to the composition. In further embodiments of this illustration, small quantities of other nutritional ingredients can be added as fortifications including but not limited to milk solids, vitamins, minerals, taste-masked compositions of omega-3-fatty acids including Alpha Linolenic acid, Eicosapantenoic acid and Docosahexaenoic acid. To the compositions that are intended for diluting with water or milk before consumption; sweeteners including high intensity sweeteners can be added; or salty recipes can be prepared in buttermilk as a diluent.

In another embodiment of the invention, the fraction to which a food ingredient is added could be the fibrous fraction that remains after juice is separated from the wet ground pulp of the green leafy vegetation. Such a fibrous fraction is a green mass which can be dried and milled. If wet grinding is done in a hammer mill a good proportion of fiber would already be in a finely divided state and may be usable directly after isolating from other constituents with or without drying. Fibrous fraction is extremely unpalatable, dry, repulsive ingredient in the mouth that is also irritating to throat if attempted to be consumed without any adjuvants that would make the mixture palatable. In one illustration of this invention containing fibrous fraction, a curd was prepared after mixing with milk and adding an inoculum of curd (lactobacilli culture). Taste of this curd was very good, it could be consumed as such as well as with other constituents of a meal without getting dry, fibrous or irritating feel in the mouth or in the throat. In another illustration of composition of this invention containing fibrous fraction, adding at least one dry food ingredient, including but not limited to, rice, pulses, dried tomato powder and condiments including dried onion powder, dried garlic powder, "Ready-to-make" mixes of Instant Soup preparation were prepared. Thickening agents gave a thickened constancy that gave a good stable suspension property to the soup so that the fiber particles remained afloat and did not segregate and settle. Edible gums are preferred since they would also improve the nutritional property of the composition by adding soluble fiber too, which is needed for good health Such ready-to-make mixes could be consumed as soup after diluting by defined quantity of water, boiling for about three minutes. These soups were delicious and fiber in it got well blended with other constituents of the soup and did not irritate the throat nor did they give a fibrous feeling when the soup was consumed. A soup is ideally consumed at the start of the meal. This is most appropriate method of consumption of fiber because its benefits with respect to adsorption of fat and cholesterol, regulating movement and speed of movement of food in the digestive tract and its pre-biotic action would be best available when it is mixed with the food eaten at the time of meal. This can be useful to make nutritional bars. For use as an ingredient in food supplements, fiber could be used wet preserved or could be dried, pulverized and used as an ingredient. High fiber soups are useful for making up deficiency in consumption of daily quota of dietary fiber. This correction leads to health benefits which are well known, for known or unknown reasons, including, but not limited to, improved gastro-intestinal motility, reduction or prevention of constipation, reduction in cholesterol, reduction in triglycerides, prevention of weight gain etc.

This invention discloses, in an another embodiment, a soup or a bar incorporating a green leafy vegetable and/or water insoluble fraction of the same as an ingredient. A soup or a food bar in which whole vegetable or water insoluble constituents are as ingredient has a significance from the nutritional point of view as a food supplement containing green leafy vegetable. From dietetic point of view, a 100 gram portion of green leafy vegetable is a must with lunch and dinner for the purpose of getting several nutrients in small quantities that are essential for maintaining good health. Green leafy vegetables are rarely available every day.

This invention also discloses a process of preparing a soup or a bar from a green leafy vegetable or water insoluble fraction of the same.

The present invention comprises a nutritional/food supplement that comprises at least one nutritionally active component liberated from macerated and disintegrated tissue of a green leafy vegetation and at least one more additional ingredient that makes the composition organoleptically palatable and novel products.

The said process of preparing a soup or a bar from a green leafy vegetable or water insoluble fraction of the same comprises giving heat treatment to the raw material for softening the tissue. The said heat treatment may comprise a blanching treatment in boiling water or at 121° C. under 15 pounds per square inch. The said heating treatment is followed by pulping with addition of some quantity of water, if required to facilitate pulping. Water solubles from the pulp are removed, if desired. Pulp of heat treated raw material is smooth, gelatinous and thick. This can be passes through a mesh of about 3 mm diameter holes to ensure that any big pieces or fiber that has not disintegrated is held back. To the whole pulp or pulp from which solubles have been removed, ingredients of the instant soup mix are added, heated to boil and kept boiling for about two minutes to get the soup. The soup is thick, the fiber gives a thick gelatinous body to the soup. This product may be prepared as autoclaved/pressure cooked ready-to-drink soup. The mix of pulp and instant-soup mix can also be filled up in pouches and given autoclaving treatment in a retort.

The soup, when concentrated further to such an extent that it contains some moisture but can be given a form, resulted in bars, like food bars. These bars can be of any shape such as flat rectangular bars, or cubes or any other convenient type. These bars were also palatable.

Soup and bar prepared from Spinach by above described method were tasty. However, soup and bar prepared from Fenugreek by same methods were extremely bitter. When tasted, it was realized that it is its water soluble portion that was bitter. Hence, it was decided to get rid of the water soluble part and then make a soup or bar. Accordingly, raw vegetation was pulped, pressed to separate juice form the fibrous fraction. Fibrous fraction was free from bitterness. This fibrous fraction was autoclaved for 20 minutes with water sufficient to immerse the same and pulped. However, it was surprising that the fiber, after autoclaving did not give subdivided pulp that could pass through 3 mm mesh. The resulting pulp was extremely coarse and was not palatable.

Methi vegetation was autoclaved for 20 minutes and pulped with some quantity of added water. This gave smooth pulp that could pass through 3 mm sieve and was palatable. Water was separated from the fiber. This was done by pressing through a coarse cotton cloth. Various other methods can be used for this purpose including centrifugation. The fiber was a fine and palatable mass. To this water and instant soup mix was added and boiled for two minutes. This soup and bar prepared from it had far less bitterness. If total removal of bitterness is desired, one water wash to the separated fiber may achieve this objective.

In one embodiment of invention, the oil extracted fraction of the fourth fraction i.e. oil extracted fraction of LPC was dried and stored for further use or could be mixed with bulk ingredient of desired compositions, such as breakfast cereals or parched wheat flour so that its moisture content was brought down rapidly and both the components were dried together.

In a further embodiment of the invention, the fraction used as an ingredient of a nutritional composition can be deproteinized brown juice. It contains all water soluble nutrient actives present in green vegetation such as folic acid. It may also contains water soluble polyphenols and their derivatives. When it is prepared from a green leafy vegetable or vegetation that does not contain anti-nutritional factors such as saponins, alkaloids etc. deproteinized brown juice can form an ingredient of nutritional supplements. It has an attractive sparkling golden yellow or golden brown color and it can be converted into a health soft drink, a lifestyle drink such as a cola drink with healthy ingredient by adding other ingredients such as, without limitation, a food acid, a sweetener and a flavoring ingredient. The cola drink may also be carbonated. Alternatively, deproteinized brown juice may be concentrated to a thick syrup. This syrup is micro-biologically stable at room temperature for at least up to one year. This may be used as an ingredient for several purposes and products, including but not limited to, as a flavoring ingredient in cooking recipes such as soups, vegetables, or mixed with excipients to make flavored and good tasting syrups as nutritional supplements or may be converted to a solid powdered form by further drying or by adding to it and mixing with a powder of an excipient resulting into a free flowing solid powder which can be either filled in a capsule or compressed into a tablet using standard technology of capsule making or tablet making. Syrup and dry powder of deproteinized juice fraction can be used as an ingredient of a soft drink concentrate that can be diluted with defined quantity of water before consumption. Dry powder soft drink concentrate may also be made as an effervescent drink after dilution when a dry alkali and a dry acid is added to the mix.

Shelf stability is achieved conveniently by reducing moisture content of the edible composition to less than 10%, preferably to 8%, more preferably to around 6%. When the recipe is such that it has to be high in moisture, such as but not limited to curd, bread spread, sandwich spread, cheese, paneer, pudding, sauce, the recipe shall be packaged and stored at refrigeration or freezing as appropriate until consumed. Packaging and shelf stability is considered an essential attribute since it is in this form that the compositions of this invention shall be industrially applicable.

For plants with unpleasant flavor components in the juice, when pulp of whole vegetable is proposed to be sued, for example in case of Fenugreek, the pulp can be pressed to remove the water solubles, fraction washed with one or more washes of water, used further to make a recipe such as a soup with addition of flax seed to improve taste as well as nutritive value on account of its content of alpha linolenic acid fractions in its oil. The expressed water from the pressed autoclaved vegetation can be used after concentrating by converting into a drink by adding flavor modifiers or may be concentrated, made into a syrup with adding flavoring substances or dried altogether, encapsulated and consumed as supplements of water soluble nutrients of those plant species, unless the water solubles contain any toxic element, in which case this fraction is totally discarded.

Edible oil extract of LPC can simply be converted to gelatin capsule in the range of 100 milligram to 1000 milligram.

Ingredients that give stable suspensions with LPC and flavor masking effect on LPC would give same effect over insoluble and grassy flavored fibrous fraction too.

These experiments provided basis and direction in making formulations of various types in breakfast cereals, beverages and soups.

In the following examples are given non limiting illustrations of compositions of this invention. Variation that shall be obvious to a person of an ordinary skill in the art and they are included within the scope of the disclosed and claimed invention. Illustrations are given for plant species Spinach (*Spinacea oleracea* L.), Fenugreek (*Trigonella graecum* L.), Lucenrne (*Medicago sativa* L.) and cowpea (*Vigna unguiculata* L.). However, as explained above, the invention can be extended to all green leafy plant species when they are brought under proper husbandry and cultivated hygienically.

All below mentioned examples are illustrative only, they do not limit the scope of the claims and any variation and any new application and new crop thoughts for use are considered in the scope of this invention.

EXAMPLES

Example 1

Materials and Methods:

Green leafy vegetation: Edible green leafy vegetables available in market were purchased for this work, washed clean under running water, root portion cut off and tender shoot portion with leaves (designated as "vegetation") was taken for further work. Green leafy vegetables selected were Spinach (*Spinacea oleracea* L.), Fenugreek (*Trigonella graecum* L.), Lucenrne (*Medicago sativa* L.) and cowpea (*Vigna unguiculata* L.). Protocols for below mentioned recipes were followed/repeated in same manner of all these three plant species mentioned above.

Parched flour of wheat or rice or Grain Amaranth: The respective grains were parched and then milled to get flour.

Puffed Grain Amaranth: This was done by parching the grains of Amaranth by subjecting it to heat treatment in a utensil until it puffs suddenly.

Puffed rice: Rice is also puffed in a similar way, but usually in a kiln as a commercial operation. The puffed rice is usually salted and was purchased from grocery shop.

Pulses: Decorticoid pulse of *Cajanus cajan* L ("Toor dahl" in Marathi language) i.e. Pigeon Pea was purchased from grocery shop.

Tomato powder, garlic powder, corn starch, salt, Spices and condiments and other ingredients of the recipes were purchased from market sources:

Example 2

Raw vegetation pulping: The vegetation was cut into small pieces about one inch in length, the pieces were charged to the jar of a domestic mixer grinder driven by electricity. Water was added just enough to avoid bridging of the charge and pulping was done until fine pulp was obtained.

Example 3

Fractionation of the vegetation: Moist fibrous fraction was separated as one primary fraction from the juice, the second fraction by pressing through a cloth. Juice is added to a pan holding boiling water at such a rate that the temperature did not fall below 80° C. at any time to get a coagulated juice. The coagulated juice was filtered through a cotton cloth to separate a water soluble deproteinized juice that is high in water content as third primary fraction from a water insoluble high protein low fiber fraction as fourth primary fraction in the form of a curd which was pressed through a cloth to remove residual deproteinized juice.

The moist fibrous fraction was washed with hot water, excess water removed and then washed fibrous fraction was dried in draft oven at 80° C. and pulverized in a pulverizer to pass though a mesh having pore size of 1 mm to get a powder. The powder often had insoluble fiber content of 55% and soluble fiber content of 0.5%. By itself, this fraction as a dry powder was unpalatable when made from any plant species, it was insoluble, had coarse texture, could not be consumed either by chewing or by drinking with a fluid as it gave irritating fibrous feeling to throat.

The fourth fraction water insoluble high protein low fiber fraction was, depending on plant species used, of light green or dark green color about 45 to 60% protein, 10-15% crude fat, about 5% ash (about 1% acid insoluble ash), less than 1% fiber and rest carbohydrates. This fraction was either dried and stored for further use or was extracted with flax oil by passing flax oil through a column of loosely packed moist curd, the oil separated from the curd by pressing through a cloth and then by adding water to the fraction so that loosely bound residual oil separated from the curd and was skimmed off; giving two sub fractions of the fourth fraction (a) sub-fraction 1 comprising oil enriched with oil soluble components of the curd comprising carotenes, xanthophylls, polyunsaturated and other fats, alpha tocopherol and other oil soluble constituents of the curd, and (b) oil extracted fraction of the fourth fraction which was dried and stored for further use or could be mixed with bulk ingredient of desired compositions, such as breakfast cereals so that its moisture content was brought down rapidly and both the components were dried together.

This fourth primary fraction had, however, unfavorable organoleptic properties such as grassy flavor, poor dispersibility in beverages, dark green color and gritty texture when dried. It imparted unfavorable and often unacceptable taste or appearance or flavor to all conventional recipes in which it was incorporated.

Making Fractions of vegetation on a large scale: 100 kg of Green leafy vegetable Fenugreek, Cowpea and Lucerne were taken for the purpose of fractionation. Roots were removed, the shoots, were washed thoroughly with water and pulped in a pulveriser. The pulp obtained was centrifuged to separate juice fraction from fiber fraction. The fiber fraction was then treated with hot boiling water for about half hour and then centrifuged to remove excess and residual water. The fiber fraction was kept in draft oven at 80° C. for drying. The juice fraction was added to a pan containing boiling water. The juice was added at such a rate that the temperature of the pan never fell below 80° C. to get coagulation of the juice and to get a curd which is called LPC precipitated out. The deproteinized juice (DPJ) is separated from the LPC by centrifugation. The DPJ is used as such in formulations or is concentrated to a syrup by application of heat and further dried in draft oven at 80° C. This is also a fraction rich in minerals and polyphenols which are useful as nutritional supplements.

Example 4

Modification of Unfavorable Organoleptic Properties and Further Enhancement of Nutritive Value:

Masking coarseness and grassy flavor of fibrous fraction: This was achieved by using thickeners that provided slimy body to the soup making fiber particles palatable in a thick soup. Thickeners used for soups were gums, which played duel role, i.e. gave thickening so that the soup gives a good mouth-feel, coarseness of fiber is masked, when the fiber is added to water and is boiled it remains in suspension until the soup is drunk; and they contained soluble fiber which improved the value of the soup as dietary fiber supplement. Gums also helped in limiting the caloric content of the soups. To some extent, cereal flours, particularly wheat flour, corn starch also are used for the purpose of thickening. Grassy flavor of fiber was masked by adding spices and condiments, tomato powder, garlic powder, citric acid etc.

Masking Dark green color, gritty texture and grassy flavor of the fourth fraction—water insoluble high protein low fiber fraction LPC or its sub-fraction, and grassy taste of green leafy vegetables:

It was found that parched wheat flour, parched grain amaranth, puffed grain amaranth and puffed rice had an agreeable aroma even when eaten dry without any further additives. These were selected as flavor modifiers for recipes prepared from the fourth primary fraction i.e. water insoluble high protein low fiber fraction and/or fibrous fraction.

Combinations of 1 gram LPC to 1, 3, 6 and 10 gram each of parched wheat flour, parched grain amaranth, parched rice flour, puffed grain amaranth and puffed rice were made. These mixtures were added to 100 ml water each, mixed well, then heated to boil and poured in vertical glass containers of 125 ml capacity. Rate of sedimentation and segregation of the mixture in different layers was observed. It was found that rice flour and puffed rice failed to prevent sedimentation and segregation of the mixture in all the combinations. Combination of "1 g LPC:6 gram of parched wheat flour" was seen to the first combination in the ascending series of wheat flour in proportion to LPC which was found to give a mixture which sedimented to a very small extent and all the constituents, including the powder of LPC, remained in stable suspension even up to four hours. Parched Grain Amaranth flour also supported stable suspension when mixed at "1 gram LPC: 10 gram Parched Grain Amaranth flour", with Puffed Amaranth flour being close to it by giving a stable suspension at "1 gram LPC:10 gram Puffed Amaranth flour". A stable Suspension no. 1 was obtained when suspension "1 gram LPC:6 gram Parched wheat flour" was mixed with "1 gram LPC:6 gram puffed grain Amaranth". This result is useful in view of the fact that puffed Grain Amaranth flour has better taste and feel than just parched Grain Amaranth as puffed Grain Amaranth reduced the "dusty feel" or "powdery feel" of the composition; and "1 gram LPC:6 gram Puffed Grain Amaranth" failed to give a stable suspension. At the same time, when a suspension "1 gram LPC:6 gram parched wheat flour" was mixed 1:1 with and a suspension "1 gram LPC:6 gram Puffed rice" failed to maintain stability in the resulting Suspension no. 2. However, Suspension nos. 1 and 2 when mixed together, surprisingly gave a Suspension no. 3 which remained stable for more than an hour. Further, a suspension of "1 gram LPC:10 gram of parched wheat flour" when mixed 1:1 with a suspension of "1 gram LPC:10 gram Puffed Grain Amaranth flour" gave a stable Suspension no. 4; and a suspension of "1 gram LPC:10 gram Parched wheat flour" when mixed 1:1 with a suspension of "1 gram LPC:10 gram puffed rice" gave a stable Suspension no. 5 although it had puffed rice in it which never gave stable suspension before. This stability of suspension in spite of presence of puffed rice was maintained when Suspension 4 was mixed 1:1 with suspension 5 to give rise to a stable Suspension 6. Still further, when Suspension no. 3 was mixed with Suspension no. 6 in 1:1 proportion, the resulting suspension no. 7 remained stable for a long time.

Example 5

Making a Recipe with Whole Green Leafy Vegetable as an Ingredient

Preparatory Cooking:

Root portion of the vegetation was cut off, which removes about one third of the plant body, 100 k of was washed thoroughly with water followed by cooking in boiling water for 20 minutes or in an autoclave at 120° C. at 15 psi for 20 minutes. The vegetation was then pulped in a domestic kitchen grinder mixer to get a pulp.

It was seen that in case of spinach, pulp of vegetation treated with boiling water gave a thick smooth pulp, but the pulp from autoclaved vegetation was smoother. In case of Fenugreek, vegetation treated with boiling water was coarse, and the pulp from vegetation that was autoclaved was smooth and thick.

Hence, for further work, pulp from autoclaved vegetation was preferred for all plant species.

Soup or food bar from the pulped vegetation: To a pulp from 100 gram fresh vegetation, was added an 8 gram mixture of a soup composition as given in Table 1 except the fiber component, the mixture was boiled for 2 to 3 minutes to convert it into a soup and was either deep frozen or packaged in a polymer film pouch that can withstand autoclaving and autoclaved. Alternatively, the boiled mixture was spread as thin sheet and heated further cautiously to achieve drying without charring. When moisture content was low enough, the mass was scraped off, made into a bar and the bar was dried further.

It was seen that Fenugreek soup prepared from whole vegetation tasted bitter. Hence, in another experiment, after making pulp of autoclaved vegetation, the pulp was dewatered by pressing through a cloth. The water pressed out from the pulp of Fenugreek tasted extremely bitter and the fiber was free from bitter taste.

Soup from Spinach tasted very good without removal of water.

All soups had, on 100 gram dry matter basis, dietary fiber more than 6 gram.

Example 6

Compositions from Fractions of Green Leafy Vegetation: Breakfast Cereals, Beverages and Snacks:

a) A mix of Parched wheat flour, LPC and Parched Grain Amaranth or Puffed and powdered Grain Amaranth was prepared in various proportions with small quantity of puffed rice occasionally. Proportion of LPC as 10% in all combinations, 90% being contributed by other ingredients. This could be packaged and was microbiologically stable for more than one year. The attractive flavor of parched wheat flour combined with attractive flavor of parched Grain Amaranth flour or puffed Grain Amaranth flour largely masked the grassy flavor of LPC except some agreeable flavor of the original vegetable, which was agreeable since it was familiar to the people. The mixture could be eaten raw also with addition of desired sweetener, it could also be consumed as a beverage when water or milk or buttermilk was added in a proportion of 125 ml to each 10 gram mixture and brought to boiling, and sweetener or salt added to it as per individual taste. The resulting suspension was stable for a reasonably long time for a person to consume it and appeared brown with green particles stably floating throughout. Appearance of the recipe was white in dry condition also with light green particles dispersed throughout. The nutrient content of this formulation was, per 100 gram dry matter, fiber 8%, protein 18% of energy value of 100 gram composition, calories 375 kcal, calcium 495, iron 33 mg.

b) Various breakfast items were prepared using LPC extracted from all crop plants illustrated in this work. The items prepared were 1) Indian rice-pulse mix (Khichadi in local language) where a mix of LPC and other cereal ingredient like whole wheat, rice, moong dahl (*Vigna radiate* L), oats, ground flax, amaranth, spices and condiments are added so that the beta carotene 700 microgram.

c) Making high fiber soups: The compositions were made such that on one hand it became palatable, coarseness of the fiber was masked and the dietary fiber content was at least 9%. Several permutations and combinations were made with various ingredients, some of them are illustrated below. The soup compositions were tasted by a panel of 5 trained judges who recorded their assessment of whether the taste is acceptable or not by "yes" or "no". The majority decisions are recorded below for the illustrative soup compositions. The soup compositions recorded as "no" were generally bitter when the fibrous fraction was from Fenugreek or were not agreeable in general taste when the fibrous fraction was from vegetables other then Fenugreek.

TABLE 1

Various Compositions of soup with fibrous fraction dry powder as an ingredient

Composition of 1000 g instant soup composition Weight in grams

| Property of the composition or Ingredients | Soup 1 | Soup 2 | Soup 3 | Soup 4 | Soup 5 | Soup 6 | Soup 7 | Soup 8 |
|---|---|---|---|---|---|---|---|---|
| Acceptance by taste panel: yes or no | No | Yes | Yes | Yes | Yes | No | No | No |
| Fibrous fraction from Green leafy vegetable | 300.0 | 100.0 | 150 | 150 | 50 | 300 | 300.0 | 200.0 |
| Gum acacia | | 100.0 | | 75 | 100 | | | |
| Whole flax seed | | 50.0 | | | | | | |
| Tomato powder | 83.3 | 40 | 300 | 100 | 300 | 170 | | 195.0 |
| Onion powder | 33.3 | | 60 | 80 | 60 | 60 | 53.3 | 100.0 |
| Milk powder | | 30 | 60 | 80 | 60 | 60 | 50.0 | 90.0 |
| Refined wheat flour (Maida) | | | 50 | | 50 | | | |
| Corn flour | | | 50 | 100 | 50 | | | 50.0 |
| Salt | 100.0 | 100 | 100 | 90 | 80 | 100 | 100.0 | 100.0 |
| Black pepper | | | 10 | 10 | 10 | | | |
| Sugar | 66.7 | 60 | 80 | 70 | 100 | 66.7 | 66.7 | 70.0 |
| Monosodium Glutamate | | 20 | 20 | 20 | | 50 | 26.7 | 20.0 |
| Garlic powder | 26.7 | 40 | 30 | 30 | 40 | 10 | | 35.0 |
| Chilli powder | 10.0 | 10 | 10 | | 10 | | | 10.0 |
| sago powder | 116.7 | | | 75 | | 93.3 | 300.0 | 100.0 |
| potato powder | | 80 | 60 | 90 | 70 | 60 | 66.7 | 20.0 |
| Roasted cumin | 20.0 | 20 | 20 | 30 | 10 | 20 | 20.0 | 10.0 |
| Ginger powder | 10.0 | 20 | | | 10 | 10 | 10.0 | |
| Citric acid | | | | | | | 6.7 | |
| Toor Dahl, Pigeon pea split seeds | 233.3 | 280 | | | | | | |
| Turmeric | | 20 | | | | | | |
| Wheat flour | | 20 | | | | | | |
| modified starch | | 10 | | | | | | |
| Total weight grams | 1000 | 1000 | 1000 | 1000 | 1000 | 1000 | 1000 | 1000 |

Proportion if fibrous fraction that could be used depended on other constituents used as well as on the plant species.

d) Fiber supplemented spices and condiments: Various ready-to-use mixtures of spices (Masala mixes, as called in local vernacular language Marathi in India) were made from fibrous fraction which are added as condiments during cooking to add flavor and taste of various salty recipes from vegetarian as well as non-vegetarian main ingredients such as pigeon pea dalhs, poultry, mutton, beef, pork, non-leafy vegetable etc. Mostly these condiments are meant for making these recipes tasty. These mixtures of spices, Masala mixes, would serve as excellent vehicles for adding fiber in palatable form in the recipes for improving consumption of dietary fiber. The fiber from all illustrative vegetable used in this study are mixed with mixture of ground and powdered spices mix.

e) Milk products fortified with fractions of green leafy vegetables:

(i) Fiber rich curd: Dry powder of from 2 to 6 gram of fibrous fraction was washed with water to remove residual solubles, was added to 100 milliliter of fresh milk, brought to boil, cooled to room temperature, starter culture of lactobacillus derived from small portion of traditionally prepared curd was added to it and allowed to form a curd in course of time at room temperature. When the mixture started thickening in initial phase of curd formation, it was mixed to ensure that the powder of fibrous fraction mixed uniformly throughout. At this stage, the powder of the fibrous fraction did not settle. This gave curd fortified with fibrous fraction. This fiber fortified curd was very much agreeable and tasty and could be eaten as such or with other recipes without getting any disagreeable flavor or disagreeable texture or a disagreeable taste of the fibrous fraction component. The fiber fortified curd done in this way contained at least 3 gram dietary fiber per 100 gram dry matter. Proportion of fiber per 100 ml can be increases even until it makes a thick paste into which the starter can be mixed, milk portion allowed to curdle so that after adding condiments to it, such a curdled paste can be used as a bread spread or as a spread in a sandwich. These compositions can be packaged and would keep for a long time at refrigeration temperature or when deep frozen.

(ii) Fiber rich Paneer or cheese: Fiber rich milk prepared for above fiber rich curd was curdled by adding various ways such as adding a food acid or salt or lime juice or a proteolytic enzyme. The curdled portion was separated by pressing through cloth and converted to firm slab which was cut into convenient pieces. This gave pieces of Paneer fortified with fibrous fraction and contained at least 3 gram fiber per 100 gram dry matter. This tasted agreeable and could be very easily used to add to vegetables. It would also be possible to raise proportion of fiber in the recipe until it starts becoming unpalatable when the fiber fortified paneer is added to other recipe. When such a stage would be reached will vary with individual and also with the cultural background.

(iii) Carotenoid rich milk, curd, paneer and cheese: Enriched Oil i.e. edible oil extract of the fourth fraction that is "high protein low fiber fraction" (LPC) rich in carotenoid and chlorophyll was added at various levels in milk until it was no longer able to emulsify and the milk could be consumed as such, or could be made into curd by adding starter culture of curd or made into paneer by adding a curdling agent. Milk could either be packaged in conventional way after pasteurization and consumed as such; or it could be converted into curd, paneer or cheese which could be packaged and kept at refrigeration temperature until consumed.

f) Capsules, syrups or soft cola drinks from Deproteinized Juice (DPJ): Deproteinized juice was concentrated to a syrup which could be stored for a long time without adding preservative. This syrup could also be dried completely and powdered. At this stage deproteinized juice powder could be converted to gelatin capsule in the range of 100 mg to 1000 mg.

The syrup could also be converted into concentrate of soft drink concentrate by mixing 200 mg dry powder of deproteinized juice to a commercially available soft drink concentrate that contained dry concentrate of orange juice, orange oil as flavoring agent, glucose, lactose, minerals, preservatives, emulsifiers and stabilizers. This could be diluted to get sweet tasty soft drink.

Soft drink could also be prepared by adding 200 mg dry powder of deproteinized juice to a commercially available salty soft drink concentrate that contained black salt, dextrose, citric acid, ginger, cumin, mint and green chili. This could be diluted to get salty and tasty soft drink which could be consumed with food.

Deproteinized juice 30 ml was added with above commercially available soft drink concentrates, boiled, cooled and they tasted very well and could be bottled.

g) Oil can form as good nourishment for the skin and find application as a skin cream. The 2 ml of oil extract of LPC is mixed in 2 gram petroleum jelly to form a good skin nourishing cream.

h) The oil extract obtained has been converted to make salad oil.

i) The oil extract can be made to form gelatin capsules. The oil extract in each capsule can range from 200 mg to 1 g.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A composition that comprises at least one fraction of a green leafy vegetation and at least one more ingredient wherein, the fraction is selected from a group consisting of first four primary fractions as well as sub-fraction or a modified fraction of the four primary fractions of the green leafy vegetation;

the primary fraction being obtained in a process of green crop fractionation, wherein
the fractionation process comprises the steps of
  a. comminuting fresh green crop material,
  b. separating a moist fibrous fraction as first primary fraction from the juice as second primary fraction, and treating the juice fraction to separate a water soluble deproteinized juice that is high in water content as third primary fraction from a water insoluble high protein low fiber fraction as fourth primary fraction;
and wherein,
the at least one more ingredient comprises ingredient/s that would improve usability of the fraction by overcoming organoleptic property of the fraction that is unfavorable for its consumption;
and further wherein,
  100 gram of the composition on dry weight basis would comprise at least one nutritional ingredient being selected from the group (a) dietary fiber at least 3 gram, (c) beta carotene at least 500 microgram, (d) iron at least 3 mg, (e) calcium at least 150 MCI, (CI) xanthophylls at least 4 mg, (h) folic acid at least 35 microgram, and (i) lysine at least 900 mg and Methionine plus cystine at least about 550 mg,
the composition comprising:
  a. the fraction of a green leafy vegetation comprises high protein low fiber fraction LPC) or its sub-fraction,
  b. flour of parched wheat grains, and:
  c. (i) flour of parched Grain Amaranth flour or a flour of puffed Grain Amaranth seeds, or (ii) an ingredient or a combination of additional ingredients to give flavor of all of them and also thickness required to keep the LPC particles afloat in compositions intended to be diluted under conditions of use,
  d. optionally containing garnishing of dry fruits, and
  e. optionally containing one or more flavourings selected from the group comprising nutmeg, strawberry, cardamom, Vanilla, chocolate and Cacao.

2. The composition of claim 1 wherein the green leafy vegetation used comprises a conventional green leafy vegetable or a forage crop or a by-product leaves of cole crops or leaves of legume crops or other non-toxic vegetation.

3. The composition of claim 1 wherein it is a packaged composition.

4. The composition of claim 1 wherein the composition is shelf stable.

* * * * *